(12) United States Patent
Dupont de Dinechin et al.

(10) Patent No.: US 12,141,626 B2
(45) Date of Patent: Nov. 12, 2024

(54) CONFIGURABLE INTER-PROCESSOR SYNCHRONIZATION SYSTEM

(71) Applicant: Kalray, Montbonnot Saint Martin (FR)

(72) Inventors: Benoit Dupont de Dinechin, Grenoble (FR); Arnaud Odinot, Grenoble (FR); Vincent Ray, La Tronche (FR)

(73) Assignee: Kalray, Montbonnot Saint Martin (FR)

( * ) Notice: Subject to any disclaimer, the term of this patent is extended or adjusted under 35 U.S.C. 154(b) by 589 days.

(21) Appl. No.: 16/729,118

(22) Filed: Dec. 27, 2019

(65) Prior Publication Data

US 2020/0210248 A1    Jul. 2, 2020

(30) Foreign Application Priority Data

Dec. 27, 2018   (FR) ..................... 18 74270

(51) Int. Cl.
*G06F 9/30* (2018.01)
*G06F 9/52* (2006.01)
*G06F 9/54* (2006.01)

(52) U.S. Cl.
CPC ............ *G06F 9/52* (2013.01); *G06F 9/30087* (2013.01); *G06F 9/54* (2013.01); *G06F 9/522* (2013.01)

(58) Field of Classification Search
CPC ........... G06F 9/52; G06F 9/30087; G06F 9/54
See application file for complete search history.

(56) References Cited

U.S. PATENT DOCUMENTS

| | | | | |
|---|---|---|---|---|
| 4,468,734 A | * | 8/1984 | Lanier | H04L 12/437 714/4.2 |
| 5,163,138 A | * | 11/1992 | Thirumalai | G06F 11/1666 710/316 |
| 5,222,229 A | | 6/1993 | Fukuda et al. | |
| 6,775,799 B1 | * | 8/2004 | Giorgetta | H03M 13/35 714/751 |
| 7,958,497 B1 | * | 6/2011 | Lindo | G06F 11/3632 714/799 |
| 8,922,791 B2 | * | 12/2014 | Silverbrook | G06K 19/073 358/448 |
| 2009/0097419 A1 | * | 4/2009 | Nakamura | H04L 12/5692 370/258 |
| 2012/0096292 A1 | * | 4/2012 | Mekhiel | G06F 1/12 712/E9.023 |
| 2012/0179896 A1 | | 7/2012 | Salapura et al. | |
| 2015/0339256 A1 | | 11/2015 | Dupont De Dinechin et al. | |

\* cited by examiner

*Primary Examiner* — Emerson C Puente
*Assistant Examiner* — Jonathan R Labud

(57) ABSTRACT

The disclosure relates to an interprocessor synchronization system, comprising a plurality of processors; a plurality of unidirectional notification lines connecting the processors in a chain; in each processor: a synchronization register having bits respectively associated with the notification lines, connected to record the respective states of upstream notification lines, propagated by an upstream processor, and a gate controlled by a configuration register to propagate the states of the upstream notification lines on downstream notification lines to a downstream processor.

7 Claims, 2 Drawing Sheets

CONFIGURABLE INTER-PROCESSOR SYNCHRONIZATION SYSTEM

CROSS-REFERENCE TO RELATED APPLICATION

This application is based on and claims priority under 35 U.S.C. 119 to French Patent Application No. 18 74270 filed on Dec. 27, 2018, in the National Institute of Industrial Property, the disclosure of which is herein incorporated by reference in its entirety.

FIELD

The disclosure relates to the synchronization of multiple processors executing in parallel threads of a same program sharing a same resource, and more specifically to an inter-processor point-to-point communication system allowing processors to communicate directly with other processors through register-files.

BACKGROUND

FIG. 1 shows an example of an array of 4×4 processors PE that may be integrated on a same chip. The processors are then also called "cores" and form a multi-core system. The cores or processors PE may be connected to a common bus that is further connected to a shared memory MEM. The memory MEM may contain the code of the programs executed by the processors and the working data of the programs.

Patent application US2015-0339256 discloses a point-to-point interprocessor communication technique, where processors may be grouped by four adjacent processors, as shown. Each processor in a group is connected to the other three processors in the group by wired point-to-point links. Point-to-point links are designed to allow each processor to write a notification directly into a designated register-file register of any other processor in the group.

Thus, the point-to-point links referred to here are physical links that convey bit states directly between processor registers. These physical links are not to be confused with generic communication channels between processors, such as a bus or a network-on-chip, which also allow data to be transferred between registers, but in a software-based manner, by executing generic instructions on processors that involve exchanging data through a shared memory.

More specifically, processors have in their instruction-set a group synchronization instruction that simultaneously executes a wait command with a first parameter and a notification command with a second parameter. The wait command causes the processor to suspend and wait for a bit pattern corresponding to that conveyed in its parameter to appear in an event register. The notification command causes the active bits of its parameter to be written directly into the event registers of the other processors in the group. This write only takes place at the time the processor exits its wait state.

SUMMARY

An interprocessor synchronization system is generally provided, comprising a plurality of processors; a plurality of unidirectional notification lines connecting the processors in a chain; in each processor: a synchronization register having bits respectively associated with the notification lines, connected to record the respective states of upstream notification lines, propagated by an upstream processor, and a gate controlled by a configuration register to propagate the states of the upstream notification lines on downstream notification lines to a downstream processor.

Each processor may be configured to selectively activate downstream notification lines according to a parameter of a notification machine instruction executed by the processor.

Each processor may be configured to suspend the execution of a respective program according to a parameter of a wait machine instruction executed by the processor, the suspension being raised when the synchronization register contains a pattern of active bits corresponding to the parameter of the standby instruction.

Each processor may be configured to reset the synchronization register when the suspension is raised.

The standby instruction and the notification instruction may form part of a single machine instruction executable by the processor.

The configuration register may include bits respectively associated with the upstream notification lines, the gate being configured to selectively propagate the states of the upstream notification lines according to the respective states of the bits in the configuration register.

An inter-processor synchronization method is also provided, comprising the steps of connecting a plurality of processors in a chain through lines configured to transmit respective notification bits in a same direction; in a first processor of the chain, sending a notification bit to a second processor, succeeding the first processor in the chain; and in the second processor, depending on the state of a local configuration bit, propagating the notification bit to a third processor, succeeding the second processor in the chain.

The second processor may perform the steps of saving the notification bit in a synchronization register; executing a wait machine instruction with a parameter, causing the processor to halt; and releasing the processor from the halt state when the synchronization register contains a bit pattern corresponding to the parameter of the wait instruction.

The second processor may perform the steps of executing a notification machine instruction with a parameter; and configuring notification bits to be sent to the third processor according to the notification instruction parameter.

The second processor may reset the synchronization register upon exiting the halt state.

BRIEF DESCRIPTION OF THE DRAWINGS

Embodiments will be described in the following non-limiting description, in relation to the attached figures, wherein.

DETAILED DESCRIPTION

Figure 1:
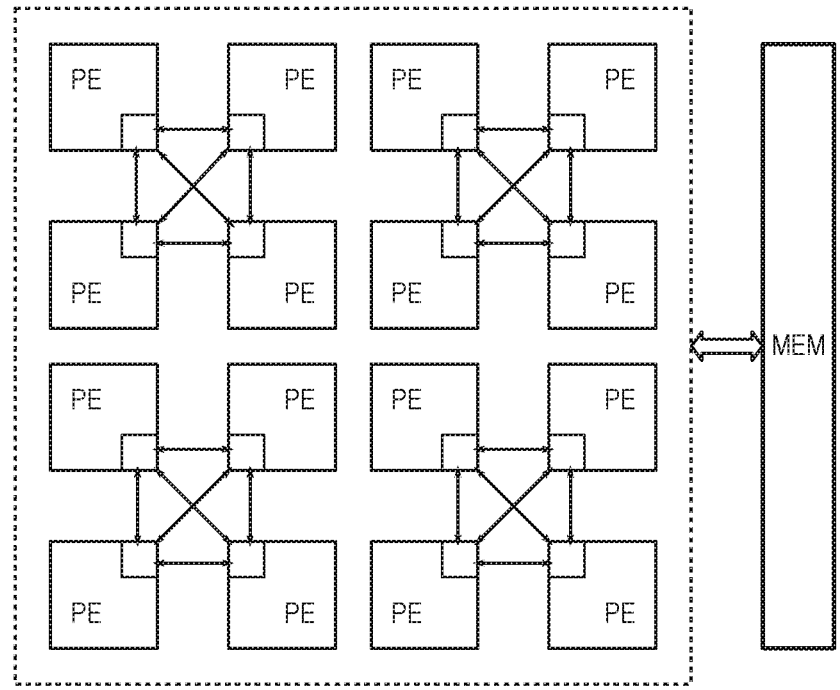
FIG. 1, previously described, illustrates a block diagram of a processor array divided into several groups in which processors can communicate through point-to-point links.

The known structure of FIG. 1 achieves synchronization with near-zero latency between the four processors in each group. Processors external to a group can also be involved in a synchronization scheme, but the synchronization between groups is then software-based using a communication channel shared by all processors, which significantly increases latency.

Figure 2:
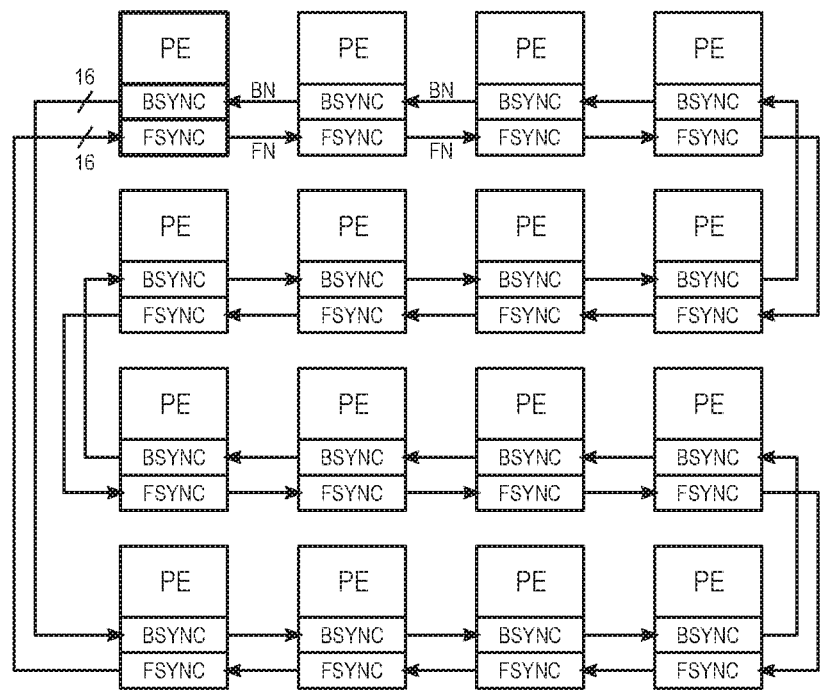
FIG. 2 illustrates a block diagram of a processor array embodiment where all processors are connected in a chain of notification links.

FIG. 2 illustrates a block diagram of a processor array embodiment organized according to a synchronization structure that allows any number of processors in the array to participate in a synchronization scheme with low latency. More specifically, the processors are organized in a configurable chain of point-to-point synchronization links. By "chain", it is understood that each processor is physically connected to only one other processor that precedes it, or upstream processor, and to only one other processor that succeeds it, or downstream processor. As represented by arrows, each link between two processors may be bidirectional, and the chain may be closed. Preferably, the chain is configured so that each processor is connected to two physically adjacent processors. As shown, the chain can run through the processors by rows, reversing direction from one row to the other.

Each processor includes a pair of synchronization units, the first unit F SYNC managing the links in a so-called "forward" direction, and the other unit B SYNC managing the links in the opposite, "backward" direction. Each forward FN or backward BN link between two processors may include several physical lines, each designed to convey the state of a bit representing an event or notification. Such a link of several lines can thus convey several notifications differentiated by the ranks of the lines.

The FSYNC and BSYNC units extend execution units traditionally provided in a processor, and may be configured to respond to two dedicated machine instructions, namely a wait instruction and a notify instruction. As in the above-mentioned US2015-0339256 patent application, the wait and notify instructions may be part of a single machine instruction called group synchronization SYNCGROUP having two parameters, one identifying wait channels and the other notify channels. If the wait channel parameter is zero, the instruction behaves like a simple notify instruction. Conversely, if the notify channel parameter is zero, the instruction behaves like a simple wait instruction. The execution of a SYNCGROUP instruction has the specificity, when it identifies at least one wait channel, of placing the processor in a wait state before issuing any notification. Notifications are issued as soon as the processor is released from its wait state.

In the present disclosure, the group synchronization instruction may have a 64-bit composite parameter, divided into 16 forward-notification bits notifyF, 16 backward-notification bits notifyB, 16 forward-wait channel bits waitclrF, and 16 backward-wait channel bits waitclrB.

Figure 3:
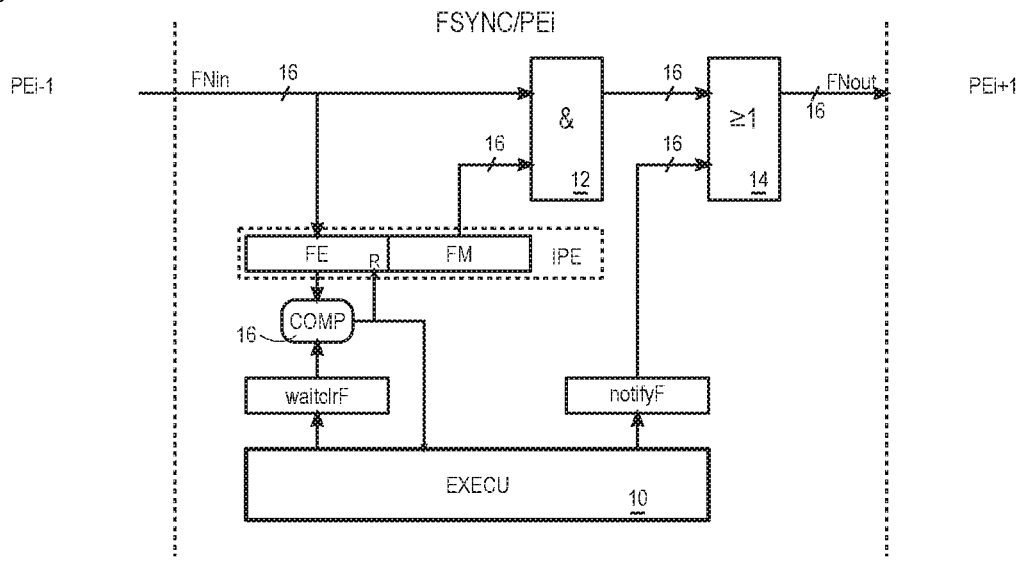
FIG. 3 illustrates a block diagram of an embodiment of a forward synchronization unit of a processor.

FIG. 3 illustrates a block diagram of an embodiment of a forward synchronization unit FSYNC of a processor PEi, where i is the rank of the processor in the chain. The processor includes execution units configured to react to machine instructions executed on the processor, including the group synchronization instruction. The processor also includes a register file, including a register dedicated to synchronization, called the Inter-Processor Event register (IPE). For example, a 64-bit IPE register may have a 16-bit forward-event field FE, a 16-bit backward-event field BE, a 16-bit forward-mode field FM, and finally a 16-bit backward-mode field BM.

The FSYNC unit shown in FIG. 3, that manages the forward-notification link FN, uses the fields FE and FM, as well as the waitclrF and notifyF parameters of the synchronization instructions. The BE and BM fields of the IPE register, and the waitclrB and notifyB parameters are used by the BSYNC unit managing the backward-notification link BN, described later.

The FE field of the IPE register is configured to record notifications arriving on the 16 incoming forward-notification lines FNin, produced by the previous processor PEi−1. For example, each bit in the FE field, initially at "0", changes to "1" when the corresponding notification line changes to "1", and the bit remains at "1" even if the line changes back to "0" subsequently.

The 16 bits of the mode-field FM of the IPE register form a first input of a bitwise AND gate 12, the other input receiving the 16 incoming notification lines FNin. The 16-bit output of gate 12 contributes to the states of the 16 outgoing forward-notification lines FNout, leading to the next processor PEi+1.

Thus, the states of the incoming lines FNin may be individually blocked or propagated on the outgoing notification lines FNout depending on the bits contained in the mode field FM. In other words, notifications from the previous processor PEi−1 may be selectively propagated to the next processor PEi+1.

The current processor PEi may also send forward-notifications to the next processor. To this end, the bits of the notifyF parameter of a synchronization instruction executed by the processor PEi are combined to the output of AND gate 12 by a bitwise OR gate 14. Thus, any bit at "1" of the notifyF parameter is transmitted on a corresponding outgoing notification line, regardless of the state of the corresponding bit of the output of AND gate 12.

When a synchronization instruction is executed by the processor PEi with a non-zero waitclrF parameter, the processor is put in a wait state and the waitclrF parameter determines the condition required to release the processor from its wait state. More specifically, the waitclrF parameter identifies, by respective bit positions, the notifications that are expected by the processor PEi. All incoming notifications are recorded in the FE register field, including those that pass through the processor but are not intended for the processor. Thus, the content of the FE field is compared at 16 with the waitclrF parameter, such that the comparison produces a "true" result when the bits at "1" of the FE register field include the bits at "1" of the waitclrF parameter. The "true" result is taken into account by the processor's execution units 10 to release the processor from its wait state so that it resumes execution of its program. In addition, the "true" result of the comparison resets the bits in the FE register field corresponding to the bits at "1" of the waitclrF parameter, so that a new wave of notifications can be taken into account.

Figure 4:
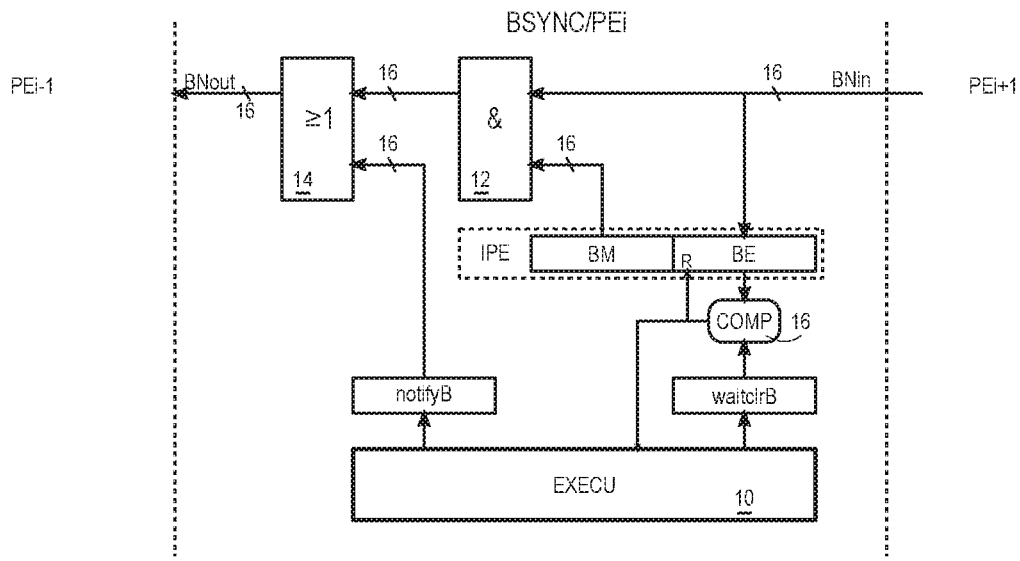
FIG. 4 illustrates a block diagram of an embodiment of a backward synchronization unit of a processor.

FIG. 4 illustrates a block diagram of an embodiment of a backward-synchronization unit BSYNC of the processor PEi. This unit uses the BE and BM fields of the IPE register, and the waitclrB and notifyB parameters of the synchronization instruction, to manage the backward-notification links BN in a similar way as the unit in FIG. 3. The structure is symmetrical for processing incoming notification lines BNin from the processor PEi+1, and outgoing notification lines BNout to the processor PEi−1.

The FM and BM mode-fields of the processor's IPE registers may be initialized by an operating system at system startup, to configure processor groups within which processors synchronize with each other. Preferably, to reduce latency, each group is made up of consecutive processors in the chain.

By default, when the BM and FN fields are set to "0" for all processors, there is no propagation of notifications but direct notifications remain possible. This creates groups of three processors, where each processor PEi can send 16 different notifications to each of its two adjacent processors PEi−1, PEi+1, and receive 16 different notifications from each of its two adjacent processors.

Setting a bit of a mode-field BM or FM to "1" in a processor PEi enables the propagation of a corresponding notification between the processors PEi−1, PEi+1 on either side of the processor PEi.

When the same bit is set to "1" in all mode fields, all downstream processors, in the direction of the links, receive a corresponding notification from any of the processors. If the chain is configured in a ring, as shown in FIG. 2, infinite looping of the propagation is prevented by setting the corresponding bit in one of the mode fields to "0".

By playing with the bit values in the mode fields, a large number of combinations of processor groups can be configured between these two extremes, and the groups may differ from one notification line to another.

In addition, regardless of the grouping chosen, each processor at the end of one group is at the intersection of two adjacent groups. Indeed, even if this processor does not propagate a notification from one group to another, it can itself issue a notification to each of the two groups, and receive a notification from each of the two groups.

The following is an application example of this structure to a barrier-synchronization. In such a synchronization, all processors involved are expected to reach a same point in execution, or barrier, in order to continue their processing.

In the structure of patent application US2015-0339256, the barrier, involving at most four processors in a group, is materialized in each processor by a register having one bit for each processor in the group. As soon as a processor reaches the barrier, it notifies the other processors by setting the bit associated to it in the registers of the other processors, then halts to wait for the other processors to reach the barrier. A halted processor resumes its activity as soon as all the bits corresponding to the other processors are set in its register, and starts by resetting the bits in its register.

Figure 5:
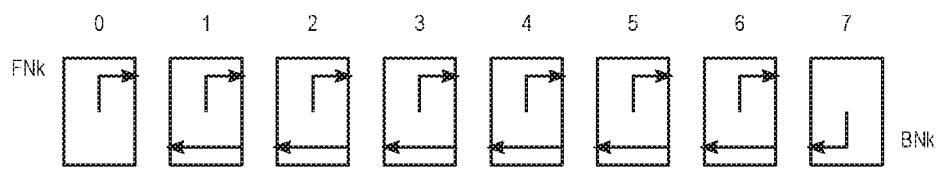
FIG. 5 illustrates a configuration example of a processor chain.

FIG. 5 illustrates a configuration of the processors in FIG. 2 to perform a barrier-synchronization involving, for example, a group of eight consecutive processors 0 to 7 in the chain. To this end, only one forward and one backward-notification line need be used between each pair of adjacent processors in the group. Although the notification lines may differ from one processor pair to another, it is assumed here, for clarity, that the notification lines used all have the same rank k, where k is between 0 and 15—thus using a forward-notification line designated FNk and a backward-notification line designated BNk between the processor pairs.

Processors 0 to 7 are all configured to not propagate forward-notifications FNk, i.e. the bit of rank k in their FE register fields is "0". As a consequence, a processor in the group can only receive a notification FNk from its immediate predecessor, as illustrated by arrows angled to the right inside the processors.

In addition, processors 1 to 6 are configured to propagate backward-notifications BNk, i.e. the bit of rank k in their BE register fields is "1". This state is illustrated by horizontal arrows to the left.

Of course, each processor can still issue any notification in both directions, and its FE and BE register fields record the notifications that pass through the processor. Thus, processor 7 is shown with an arrow angled to the left indicating that it can issue a backward-notification BNk.

Processors 1 to 6 are programmed, when they reach the barrier, to execute successively:
an instruction to wait for a forward-notification FNk,
an instruction to issue a forward-notification FNk, and
an instruction to wait for a backward-notification BNk.

The first two instructions can be implemented by a single SYNCGROUP instruction with waitclrF and notifyF parameters each identifying only rank k. The third instruction can be a SYNCGROUP instruction with all its parameters null except the waitclrB parameter, which identifies only rank k.

Processor 0 is programmed, when arriving at the barrier, to execute successively:
an instruction to issue a forward-notification FNk, and
an instruction to wait for a backward-notification BNk.

These two instructions can be implemented by two consecutive SYNCGROUP instructions whose parameters are all zero, except respectively the notifyF and waitclrB parameters, each identifying only rank k.

Finally, processor 7 is programmed, when arriving at the barrier, to execute successively:
an instruction to wait for a forward-notification FNk, and
an instruction to issue a backward-notification BFk.

Both instructions can be implemented by a single SYNCGROUP instruction with waitclrF and notifyB parameters each identifying only rank k.

The processors 0 to 7 thus enter a wait state as they reach the barrier. Processors 1 to 7, starting by executing a wait instruction, do not issue a notification until the barrier is removed. Only processor 0 starts with a notification instruction FNk as soon as it reaches the barrier, before suspending in turn to wait.

The notification FNk issued by processor 0 is recorded by processor 1, which exits its wait state by issuing a notification FNk to the next processor 2. Processor 1 goes into a wait state again, this time waiting for a backward-notification BNk. Indeed, although processor 1 has reached the barrier, it is not known if the other downstream processors have reached it.

These events propagate from processor to processor up to processor 7. As soon as it receives the notification FNk, processor 7 issues a backward-notification BNk to processor 6, and resumes execution of its program. The barrier has been reached by all processors, because the last processor 7 only receives a notification if all previous processors have issued one upon reaching the barrier.

Since processor 6, as well as processors 1 to 5, are configured to propagate the backward-notification BNk, the notification BNk arrives almost simultaneously to all processors 0 to 6. Each of these processors exits its wait state and resumes execution of its program.

This synchronization structure also opens up new possibilities for parallel processing, especially for loops whose iterations are not independent. Iterations are independent in a loop when their accesses to shared data, such as arrays, are performed on different elements.

A conventional multi-core structure allows multiple processors to be allocated to run multiple iterations of a loop in parallel. For example, each iteration of a loop of the following type is independent and can be assigned to a different core:

```
for (i=0; i < n; i++) {
    a[i] = a[i] + b[i];
}
```

Indeed, it is known at any time that the variable a[i], as an operand, is defined and up-to-date. This type of loop is called a parallel loop. In practice, this loop is transformed as follows into NB_PE parallel subloops, where NB_PE is the number of processors allocated to the execution and pid is the number of the processor that executes the subloop:

```
for (i = 0; i + pid < n; i += NB_PE) {
    int ii = i + pid;
    a[ii] = a[ii] + b[ii];
}
barrier(pid);
```

The "barrier" directive refers to a function that is typically available in the execution environment of multi-core processors, for example pthread_barrier_wait.

There are so-called vector loops where the value of an operand depends on the execution order of the iterations, for example a loop of the type:

```
for (i=0; i < n; i++) {
    a[i] = a[i+1] + b[i];
}
```

In this case it is incorrect to run two iterations of the loop in parallel, for example:

$a[1]=a[2]+b[1]$, and $a[2]=a[3]+b[2]$

Indeed, if the second iteration is completed before the first, the variable a[2] will contain the new value while the first iteration needs the old value.

To avoid this pitfall in a conventional manner, the loop is executed by a single core, or the loop is decomposed into two parallel loops via a temporary array temp[ ] in the form:

```
for(i=0; i < n; i++) {
    temp[i] = a[i+1];
}
for (i=0; i < n; i++) {
    a[i] = temp[i] + b[i];
}
```

In the structure of the present disclosure, vector loop iterations can be processed in parallel on a processor chain by rewriting the loop as follows:

```
if (pid == NB_PE - 1) syncgroup(notifyB);
for (i = 0; i + pid < n; i += NB_PE {
    int ii = i + pid;
    float t1 = a[ii+1] + b[ii];
    if (pid == NB_PE - 1) syncgroup(notifyB);
    else syncgroup(notifyF);
    if (pid == 0) syncgroup(waitclrB);
    else syncgroup(waitclrF);
    a[ii] = t1;
}
if (pid == NB_PE - 1) syncgroup(notifyB) ;
else syncgroup(notifyF);
barrier(pid);
```

Note that variables ii and t1 have a local scope limited to each loop body, while arrays a[ ] and b[ ] are global scope variables, shared by the processors.

Thus, with 8 processors, processor 0 executes:

```
for (i = 0; i < n; i += 8) {
    int ii = i;
    float t1 = a[ii+1] + b[ii];
    syncgroup(notifyF);
    syncgroup(waitclrB);
    a[ii] = t1;
}
syncgroup(notifyF);
barrier(0);
```

While processor 1 executes in parallel:

```
for (i = 0; i + 1 < n; i += 8) {
    int ii = i + 1;
    float t1 = a[ii+1] + b[ii];
    syncgroup(notifyF);
    syncgroup(waitclrF);
    a[ii] = t1;
}
syncgroup(notifyF);
barrier(1);
```

And so on, with processor 7 executing:

```
syncgroup(notifyB);
for (i = 0; i + 7 < n; i += 8) {
    int ii = i + 7;
    float t1 = a[ii+1] + b[ii];
    syncgroup(notifyB);
    syncgroup(waitclrF);
    a[ii] = t1;
}
syncgroup(notifyB);
barrier(7);
```

As in the example in FIG. 5, processors 0 to 7 are all configured to not propagate forward-notifications. In addition, processors 1 to 6 are configured to propagate backward-notifications. The waitclrF and notifyF parameters identify the forward-notification lines used, all of rank k in the example considered. Similarly, the waitclrB and notifyB parameters identify the backward-notification lines used, all also of rank kin the example considered.

At the first iteration, processor 0 executes:

```
1: t1 = a[1] + b[0];
2: syncgroup(notifyF);
3: syncgroup(waitclrB);
4: a[0] = t1;
```

At the first iteration, processor 1 executes in parallel:

```
5 : t1 = a[2] + b[1];
6: syncgroup(notifyF);
7: syncgroup(waitclrF);
8: a[1] = t1;
```

Thus, in line 1, processor 0 reads the old value of variable a[1]. It is important that this operation takes place before the variable a[1] has received the new value updated by processor 1 on line 8. The system is therefore configured and programmed so that line 8 is always executed after line 1.

In line 2, processor 0 notifies processor 1 that it has read variable a[1]. (In line 3, processor 0 normally waits for a backward-notification to continue: this notification is issued by the syncgroup(notifyB) instruction executed by processor 7 before entering the subloop.)

In parallel, in line 7, processor 1 enters the wait state after saving the new value of a[1] in a variable t1, and only executes line 8 after the notification from processor 0 is received.

Step after step, each processor releases the next processor after reading an old variable value, so that the next processor can update the variable. The last processor in the chain sends a backward-notification (syncgroup(notifyB)) during the iteration, which releases the first processor to start a new iteration.

Finally, when each processor exits its subloop, it executes a last notification, which releases the processors still waiting, followed by a barrier type synchronization as required in the case of a parallel loop.

Note that in the loop body, each processor executes two SYNCGROUP instructions, the first one performing a notify-type operation and the second a "waitclr"-type operation. Given the chained synchronization scheme of the processors, it is in principle possible to reverse the order of these two instructions, which allows them to be combined into one. However, it may be more efficient to keep the two instructions separate in cases where a calculation not involving global variables can be inserted between these instructions. On the other hand, the inversion of the two SYNCGROUP instructions and their combination into a single one allows more general vector loops to be synchronized, where the distance in number of iterations between reading a variable and writing it back is not exactly one. This is the case, for example, of the following loop, with j>0 and variable:

```
for (i=0; i < n; i++) {
    a[i] = a[i+j] + b[i];
}
```

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An inter-processor synchronization system, comprising:
   a plurality of processors;
   a plurality of unidirectional notification lines connecting the processors in a chain; and
   in each processor:
   i) a synchronization register having bits respectively associated with the notification lines, connected to record respective states of upstream notification lines, propagated by an upstream processor, and
   ii) a gate controlled by a configuration register to propagate the states of the upstream notification lines on downstream notification lines to a downstream processor;
   wherein each processor is configured to:
   halt upon execution of a wait machine instruction by the processor, the halt state of the processor being released when the synchronization register of the processor contains a pattern of active bits corresponding to the parameter of the wait instruction, and
   selectively activate downstream notification lines according to a parameter of a notification machine instruction executed by the processor.

2. The system according to claim 1, wherein each processor is configured to reset the synchronization register when the halt state is released.

3. The system according to claim 2, wherein the wait instruction and the notification machine instruction form part of a single machine instruction executable by the processor.

4. The system according to claim 1, wherein the configuration register includes bits respectively associated with the upstream notification lines, the gate being configured to selectively propagate the states of the upstream notification lines according to the respective states of the bits in the configuration register.

5. An inter-processor synchronization method, comprising the following steps:
   connecting a plurality of processors in a chain through lines configured to transmit respective notification bits in a same direction;
   in a first processor of the chain, sending a notification bit to a second processor of the chain, succeeding the first processor in the chain; and
   in the second processor of the chain, performing the following steps:
   depending on the state of a local configuration bit, propagating the notification bit to a third processor of the chain, succeeding the second processor in the chain;
   saving the notification bit in a synchronization register;
   executing a wait machine instruction with a parameter, causing the processor to halt; and
   releasing the processor from a halt state when the synchronization register contains a bit pattern corresponding to the parameter of the wait instruction.

6. The method according to claim 5, wherein the second processor performs the following steps:
   executing a notification machine instruction with a parameter; and
   configuring notification bits to be sent to the third processor according to the notification instruction parameter.

7. The method according to claim 6, wherein the second processor resets the synchronization register upon exiting the halt state.

* * * * *